United States Patent
Li et al.

(10) Patent No.: US 9,407,435 B2
(45) Date of Patent: Aug. 2, 2016

(54) CRYPTOGRAPHIC KEY GENERATION BASED ON MULTIPLE BIOMETRICS

(71) Applicant: Intel Corporation, Santa Clara, CA (US)

(72) Inventors: Jiangtao Li, Beaverton, OR (US); Jesse Walker, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 149 days.

(21) Appl. No.: 14/126,469

(22) PCT Filed: Sep. 30, 2013

(86) PCT No.: PCT/US2013/062598
§ 371 (c)(1),
(2) Date: Dec. 16, 2013

(87) PCT Pub. No.: WO2015/047385
PCT Pub. Date: Apr. 2, 2015

(65) Prior Publication Data
US 2015/0095654 A1     Apr. 2, 2015

(51) Int. Cl.
*G06F 21/00* (2013.01)
*H04L 9/08* (2006.01)
*H04L 9/00* (2006.01)
*G06F 15/16* (2006.01)
*G06F 21/60* (2013.01)

(52) U.S. Cl.
CPC .............. *H04L 9/0866* (2013.01); *G06F 21/60* (2013.01)

(58) Field of Classification Search
None
See application file for complete search history.

(56) References Cited

U.S. PATENT DOCUMENTS

2004/0008842 A1*   1/2004   Partelow ............... G06F 3/1285
                                                               380/51
2009/0231096 A1   9/2009   Bringer
(Continued)

FOREIGN PATENT DOCUMENTS

WO    WO2009042392    4/2009

OTHER PUBLICATIONS

Abhishek Nagar et al., "Multibiometric Cryptosystems Based on Feature-Level Fusion," IEEE Transactions on Information Forensics and Security, vol. 7 No. 1, Feb. 2012, pp. 255-268 figures 1 and 2.*
(Continued)

*Primary Examiner* — Dede Zecher
*Assistant Examiner* — Trang Doan
(74) *Attorney, Agent, or Firm* — Trop, Pruner & Hu, P.C.

(57) ABSTRACT

In an embodiment, an apparatus includes a processor including a first core. The first core includes multi-biometric logic to output first biometric data $w_i$ (i=1 to n, n≥2), each $w_i$ determined based on a corresponding one of first biometric input $M_i$ (i=1 to n, n≥2) received during a first time period. The apparatus also includes setup logic to transform a cryptographic key k via a transformation that uses the first biometric data $w_i$, where transformation of the cryptographic key k results in output of helper data $h_i$ (i=1 to n). Other embodiments are described and claimed.

16 Claims, 10 Drawing Sheets

(56) References Cited

U.S. PATENT DOCUMENTS

| | | | |
|---|---|---|---|
| 2010/0246902 A1 | 9/2010 | Rowe | |
| 2011/0016534 A1 | 1/2011 | Jakobsson | |
| 2011/0047419 A1* | 2/2011 | Garnier | G06F 21/32 714/701 |
| 2011/0191837 A1* | 8/2011 | Guajardo Merchan | G06F 21/32 726/6 |
| 2012/0159184 A1 | 6/2012 | Johnson | |
| 2012/0204023 A1* | 8/2012 | Kuipers | G06F 21/10 713/150 |
| 2013/0047226 A1 | 2/2013 | Radhakrishnan | |
| 2013/0067547 A1 | 3/2013 | Thavasi | |
| 2014/0237256 A1* | 8/2014 | Ben Ayed | H04L 9/0866 713/186 |
| 2014/0325230 A1* | 10/2014 | Sy | G06F 21/32 713/171 |

OTHER PUBLICATIONS

Ya. N. Imamverdiev et al., "A Method for Cryptographic Key Generation from Fingerprints," http://link.springer.com/article/10.3103%2FS0146411612020022?LlrLrue) Automatic Control and Computer Sciences, vol. 46, No. 2, Apr. 2012, pp. 66-75.*

International Searching Authority, "Transmittal of the International Search Report of the International Searching Authority," mailed Jun. 20, 2014, in International application No. PCT/US2013/062598.

Bare, Christopher J., "Attestation and Trusted Computing," CSEP 590: Practical Aspects of Modern Cryptography, Mar. 2006, pp. 1-10.

Ya. N. Imamverdiev et al., "A Method for Cryptographic Key Generation from Fingerprints," http://link.springer.com/article/10.3103%2FS0146411612020022?Llrtrue) Automatic Control and Computer Sciences, vol. 46, No. 2, Apr. 2012, pp. 66-75.

Karthik Nandakumar et al., "Multibiometric Template Security Using Fuzzy Vault," http://ieeexplore.ieee.org/xpl/articleDetails.jsp?tp=&arnumber=4699352Biometrics: Theory, Applications and Systems 2008, Oct. 1, 2008, pp. 1-6.

U.S. Patent and Trademark Office "Method and Apparatus to Effect Re-Authentication" U.S. Appl. No. 13/832,556, filed Mar. 15, 2013.

* cited by examiner

CRYPTOGRAPHIC KEY GENERATION BASED ON MULTIPLE BIOMETRICS

TECHNICAL FIELD

Embodiments pertain to cryptographic key generation that is based on multiple biometrics.

BACKGROUND

Use of a biometric for authentication is a recent trend for non-password authentication. Biometrics may be used in biometric encryption ("biometric cryptosystem"). In a biometric cryptosystem, a cryptographic key may be transformed or unlocked from the biometric data, and this key may be used for authentication or to decrypt user secrets such as passwords or documents.

Differences between a biometric cryptosystem and conventional biometric schemes may include (1) in the biometric cryptosystem the biometric data is typically not to be stored in a database or on a platform, and so the biometric cryptosystem may offer better protection of the biometric data from offline attacks; (2) in the biometric cryptosystem the keys generated from the biometric data may be dynamic and revocable. If an end user uses biometric cryptosystem in multiple transactions, her transactions may be unlinkable; (3) a biometric cryptosystem may offer better privacy over conventional biometric schemes, as the service provider or the local platform may not keep the biometric of the end user.

Schemes to transform or to unlock a cryptographic key (also "key" herein) from biometric input are typically based on only one biometric. However, one type of biometric data (e.g., fingerprint, iris, face, palm print, voice) may not have enough entropy to provide an acceptable level of security, e.g., for a high security key.

DETAILED DESCRIPTION

Figure 1:
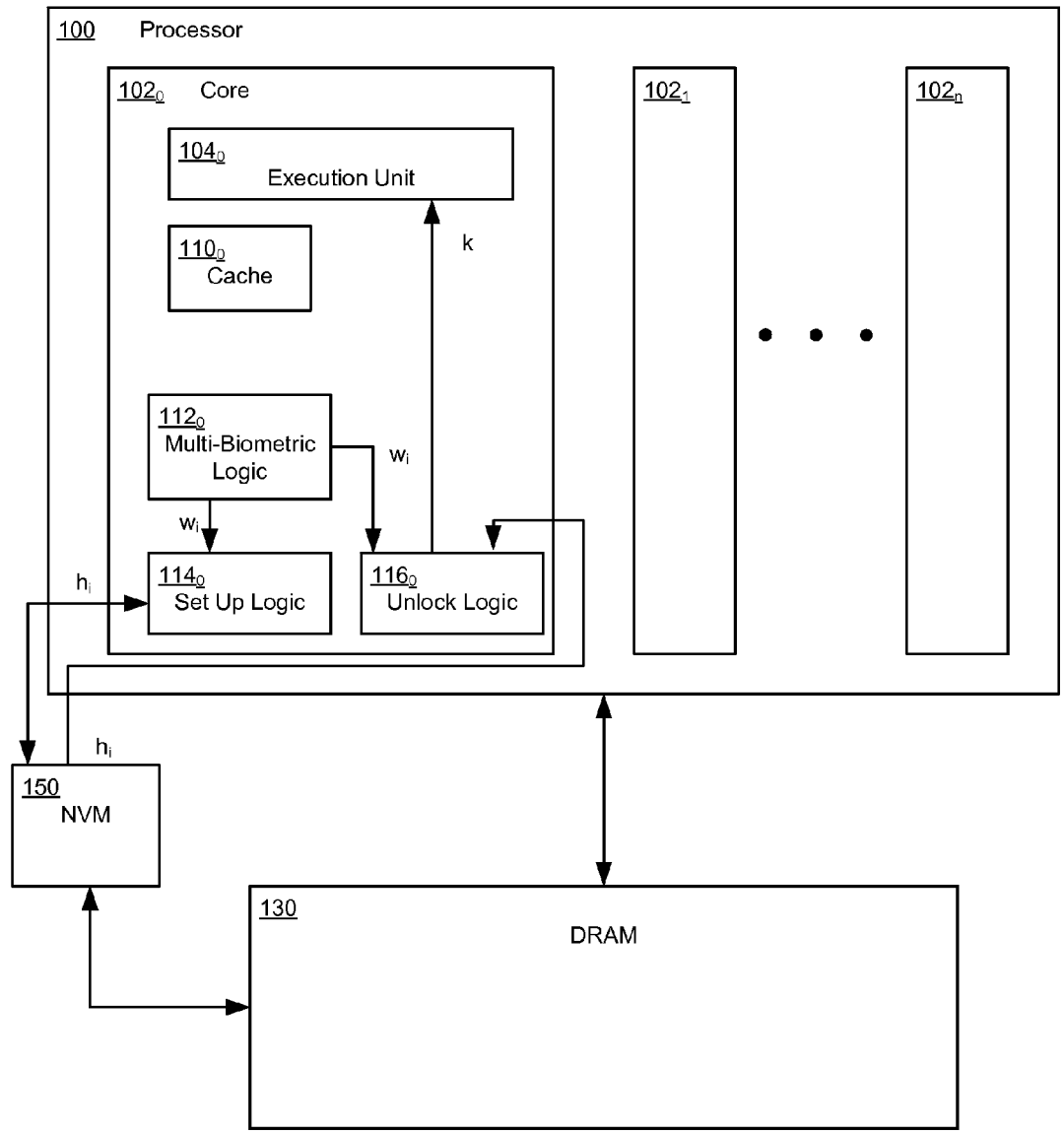
FIG. 1 is a block diagram of a system according to an embodiment of the present invention.

According to embodiments of the present invention, a new biometric encryption scheme may allow key transformation from multiple biometrics in a threshold fashion, which may provide for a better user experience and better security/entropy than conventional biometric systems.

In an embodiment, during an initial setup phase, a key may be transformed by n distinct biometric data. The key can be unlocked only if the user presents t or more matched ("valid" herein) biometric input, where $2 \leq t \leq n$.

In an embodiment, n biometric input are received concurrently at a first time period and a transformed key (e.g., that includes n component keys $k_i$) may be computed on the fly when biometric data are determined based on the biometric input. As a result, it may be difficult for an attacker to spoof a sufficient number of biometrics to unlock the key from the component keys $k_i$.

In an embodiment, there are two phases in biometric transformation: a setup phase and an unlock phase. In the setup phase, a key k is chosen and input, and n different biometric data $(w_1, w_2, \ldots w_n)$ are input, each $w_i$ based on a corresponding biometric input $M_i$ made at a first time period. The output is a transformation of the key k, including "helper data" $h = h_i = (h_1, h_2, \ldots h_n)$, each helper data $h_i$ corresponding to the biometric data $w_i$. The helper data may be stored and retrieved for unlocking. In the unlock phase, biometric data $w' = w_i' = (w_1', w_2', \ldots w_n')$ may be input, with each $w_i'$ based on a corresponding biometric input $M_i'$ received at a second time period subsequent to the first time period. When at least t of the n measured biometric data $(w'_1, w'_2, \ldots, w'_n)$ are valid ("correct"), where t is a threshold value, and the helper data $(h_1, h_2, \ldots h_n)$ from the setup phase, the secret key k can be unlocked and output.

In an embodiment, a technique known as Shamir's secret sharing may be employed to divide the key k into a plurality of component keys $k_i$, and may be used along with one or more cryptographic schemes, e.g., fuzzy commitment, fuzzy vault, and/or fuzzy extractor in order to transform and/or unlock the key k based on the biometric data $w_i$ (or $w_i'$).

Different biometric cryptographic schemes may work well on specific biometrics. For example, a fuzzy commitment scheme is typically effective for an iris biometric. A fuzzy vault scheme is typically effective when applied to fingerprints and palm prints. Fuzzy extractors offer higher level of security than some other techniques, due at least in part to random extraction of the component keys.

In an embodiment, a specific cryptographic scheme may be used for each kind of biometric to transform a key, and the results may be combined to unlock the key. For example suppose an end user uses face, voice, fingerprint, and iris biometrics (n=4) for locking up a secret. Only if the end user presents at least t matched (e.g., valid) biometrics, where $2 \leq t \leq 4$, can he/she unlock a secret. Thus, various biometric cryptographic schemes can be combined to achieve a high level of security.

Several transformation schemes are described below.

Fuzzy commitment has two phases: setup and unlocking.

Fuzzy commitment setup. In the setup phase, a secret key is chosen or provided as input. Let $w_i$ be processed biometric template data derived from raw biometric image data, e.g., biometric input received from a biometric sensor that measures a particular biometric input. A key k may be divided into component keys ($k_i$, i=1 to n) and each component key $k_i$ may be encoded into a corresponding code $c_i$. Helper data $h_i$ may be calculated as $h_i = c_i$ XOR $w_i$.

Fuzzy commitment unlocking. In the unlocking phase, the helper data $h_i$ may be input. Each biometric input is received again at a second time period. Let w' (=$w_i'$ i=1, n) be biometric data $w_i'$ that is based on the received biometric input $M_i'$. Each $M_i'$ that satisfies a validity criterion (e.g., predetermined Hamming distance between $M_i'$ and $M_i$, or another measure of difference between $M_i'$ and $M_i$) is determined to be valid (e.g., correct), and so the corresponding $w_i'$ is deemed valid. Assuming that at least t values of $w_i'$ are valid, an unlocking process computes $c_i' = h_i$ XOR $w_i' = c_i$ XOR ($w_i$ XOR $w_i'$). Each $c_i'$ is then transformed to a corresponding $k_i$, from which k is obtained.

Fuzzy vault. The biometric input $M_i$ (received at a first time period) may be a binary string or a set of values (e.g., fingerprint data). If a key k is locked using a biometric data $w_i$ (determined based on the biometric input $M_i$), typically the key k can be unlocked by other biometric data w' (determined based on biometric input $M_i'$ received at a second time period) if w and w' have a large overlap. The key k may be selected prior to application of the fuzzy vault scheme.

Fuzzy vault setup phase. A polynomial p may be selected that encodes the secret key k, e.g., the coefficients of p may be formed from k. The input data $w_i$ may be projected onto p, and p ($w_i$) is computed. Optionally, chaff points may be added (e.g., randomly selected) in order to obscure genuine points of the polynomial. The set of all points p ($w_i$) is the helper data $h_i$.

Fuzzy vault unlock phase. The helper data $h_i$ and second biometric data $w_i'$ are input. If $w_i'$ has large overlap with the biometric data $w_i$, a sufficient number of points of $h_i$ that lie on the polynomial p can be located. A transformation can be applied to reconstruct p, enabling k to be recovered.

Fuzzy extractor differs from fuzzy commitment and fuzzy vault in that the component keys $k_i$ are generated from the biometric data w.

Fuzzy extractor setup phase. A key k is selected (e.g., by a user). Helper data $h_i$ is computed based on input biometric data $w_i$ (e.g., based on biometric input $M_i$ received at a first time period) and component keys $k_i$ are also computed from the selected key k and are based on the biometric data $w_i$.

Fuzzy Extractor Recovery (key generation) phase. The original $w_i$ is recovered from fuzzy biometric input $w_i'$ (e.g., based on biometric input $M_i'$ received at a second time period) and on the helper data $h_i$. The key k is then extracted from $w_i$.

FIG. 1 is a block diagram of a system according to an embodiment of the present invention. The system includes a processor 100, a dynamic random access memory (DRAM) 130, and non-volatile memory (NVM) 150.

The processor 100 may include one or more cores $102_0$, $102_1$, ... $102_n$. For example, a first core $102_0$ may include an execution unit $104_0$, a cache $110_0$, multi-biometric logic $112_0$, setup logic $114_0$, and unlock logic $116_0$.

In operation, at a first time period, the multi-biometric logic $112_0$ may receive a plurality of measured biometric input ($M_i$, i=1 to n) corresponding to respective biometric variables. For example, the biometric variables may include any of facial, voice, fingerprint, iris biometrics, or other biometrics. The multi-biometric logic $112_0$ may output biometric data w (=$w_1$, $w_2$, ... $w_n$) based on the received raw biometric input $M_i$. The biometric data w may be input to setup logic 114 that may output helper data h (=$h_1$, $h_2$, $h_n$) based on the biometric data w and based upon a cryptographic key k. For example, in some embodiments the setup logic $114_0$ may divide the key k into a plurality of component keys ($k_1$, $k_2$, ... $k_n$) and each of the component keys $k_i$ may be processed according to a corresponding biometric cryptosystem (e.g., fuzzy commitment, fuzzy vault) using corresponding biometric data $w_i$ to yield corresponding helper data $h_i$. The helper data h may be stored in NVM 150. In some embodiments, the key k and the biometric data w are not stored in the processor 100.

At second time period that is subsequent to the first time period, if a threshold number of t out of n measured biometric input $M_i'$ is satisfied, (e.g., t of the biometric input $M_i'$ are deemed valid by a fuzzy logic test), the multi-biometric logic $112_0$ may provide biometric data w' (=$w_i'$) based on the biometric input $M_i'$ received at the second time. The unlock logic $116_0$ may regenerate the key k based on biometric data w' received from the multi-biometric logic $112_0$ and the helper data stored at the NVM 150, and may provide the key k to the execution unit $104_0$.

In another embodiment, the multi-biometric logic $112_0$ may provide the biometric data w at the first time period to the setup logic $114_0$, which, through use of a fuzzy extractor scheme, may produce both the helper data h (e.g., via a sketch procedure) and the key k (e.g., via an entropy extractor). In an embodiment, the key k is not stored at the processor 100.

At the second time period the unlock logic $116_0$ may recover the key k through a recover procedure of the fuzzy extractor scheme based on biometric data w' (e.g., based on biometric input $M_i'$ received at the second time period) received from the multi-biometric logic $112_0$, and the helper data h that may be retrieved from, e.g. the NVM 150. The biometric data w' may be supplied responsive to a threshold number of biometric input $M_i'$ being valid (e.g., correct), where $2 \le t \le n$. In some embodiments, t is less than n.

Figure 2A:
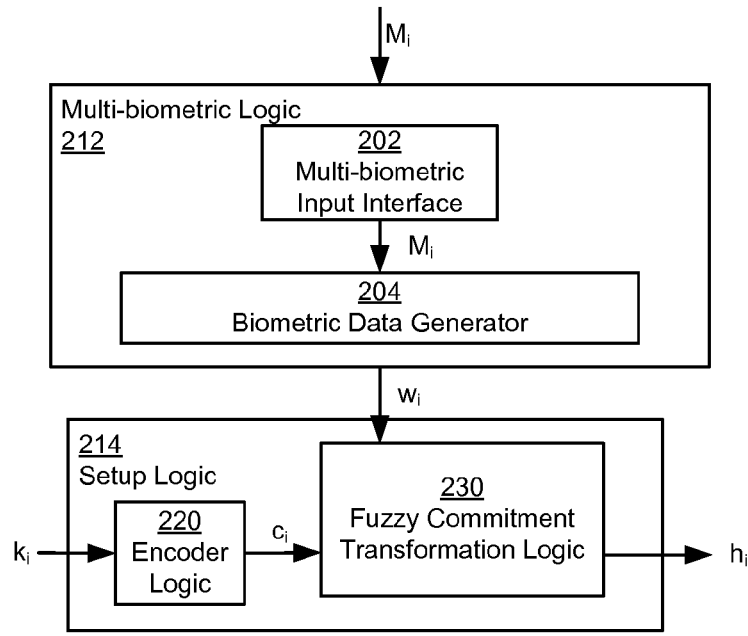
FIG. 2A is a block diagram of an apparatus to transform a key, according to an embodiment of the present invention.

FIGS. 2A, B are block diagrams of an apparatus to perform transformation and recovery of a key, according to an embodiment of the present invention. Turning to FIG. 2A, shown is a block diagram of a portion of a processor, such as the processor 100 of FIG. 1. Multi-biometric logic 212 includes multi-biometric input interface 202 and multi-biometric data generator 204. The multi-biometric logic 212 may be coupled to setup logic 214, which includes an encoder 220 and fuzzy commitment transformation logic 230.

In operation, the multi-biometric input interface 202 may receive biometric input $M_i$ from, e.g., a plurality of biometric sensors. The biometric data generator 204 may generate n biometric data w ($w_1$, $w_n$) based upon the received biometric input $M_i$. The generated biometric data w may be input to the setup logic 214. A cryptographic key k may be randomly selected and may be divided into component keys $k_i$, (e.g., via Shamir secret sharing or another technique). Each component key $k_i$ may be input to the encoder logic 220, which may output a $c_i$ that is a representation of the component key $k_i$. Each $c_i$ may be input to fuzzy commitment transformation logic 230, which may output helper data $h_i$ that is based on $c_i$ and $w_i$.

In an embodiment, $$h = (c) \text{XOR}(w), \text{ e.g.,  } h_i = (c_i) \text{XOR}(w_i) \text{ for } i=1 \text{ to } n.$$

Figure 2B:
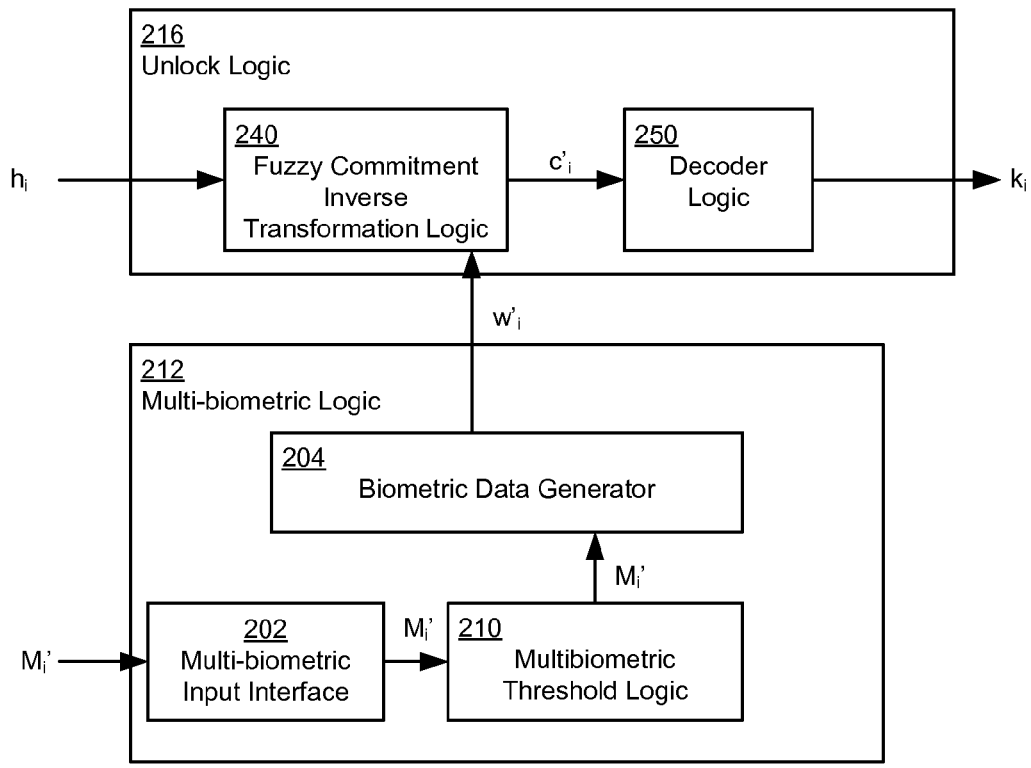
FIG. 2B is a block diagram of another apparatus to generate a key, according to an embodiment of the present invention.

Turning to FIG. 2B, a portion of a processor, such as the processor 100 of FIG. 1, is shown. In the unlock process, the helper data $h_i$ is input to unlock logic 216. The n biometric input $M_i'$ are received at a second time period via the multi-biometric input interface 202 to multi-biometric threshold logic 210, and it is determined whether a threshold t (where $t \ge 2$) number of biometric input $M_i'$ are valid. In an embodiment, validity may be determined by, e.g., determination of a corresponding Hamming distance for each $M_i'$. In an embodiment, t is less than n. Provided the threshold t number of biometric input $M_i'$ are valid, the biometric data generator 204 may generate biometric data w' based on the received biometric input $M_i'$. The fuzzy commitment inverse transformation logic 230 may compute $c_i'=(h_i)$ XOR $(w_i')=(c_i)$ XOR $(w_i$ XOR $w_i')$, and $c_i'$ may be input to decoder 240 to produce the component key $k_i$, from which k may be obtained.

Figure 3A:
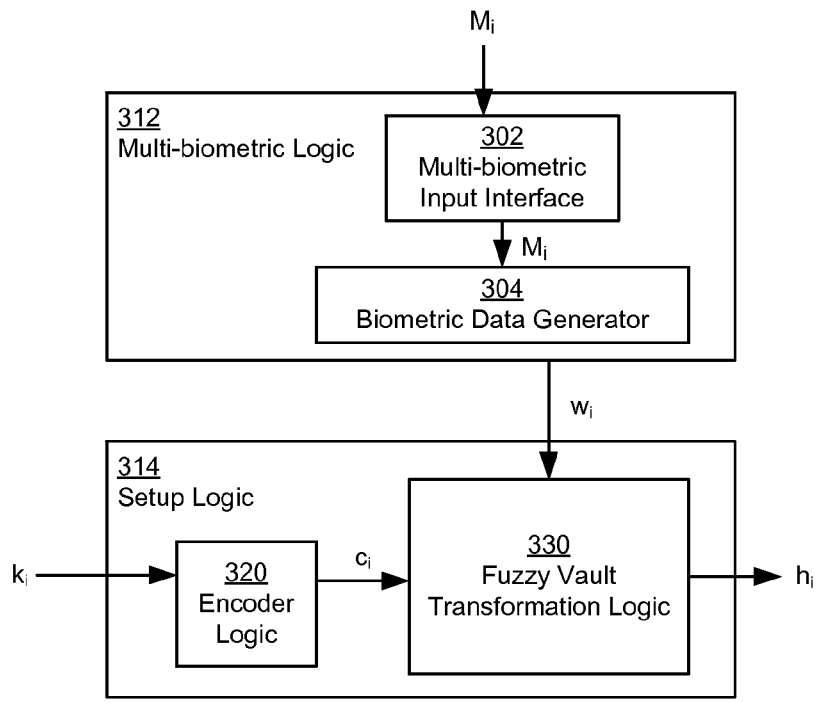
FIG. 3A is a block diagram of another apparatus to transform a key, according to an embodiment of the present invention.

FIGS. 3 A, B are block diagrams of apparatus to perform transformation and generation (e.g., recovery) of a key, according to another embodiment of the present invention. Turning to FIG. 3A, shown is a block diagram of a portion of a processor such as the processor 100 of FIG. 1. Multi-biometric logic 312 includes multi-biometric input interface 302 and biometric data generator 304. The multi-biometric logic 312 is coupled to setup logic 314, which includes an encoder 320 and fuzzy vault transformation logic 330.

In operation, the multi-biometric input interface 302 may receive biometric input $M_i$ (i=1 to n) from, e.g., a plurality of biometric sensors. The biometric data generator 304 may generate n biometric data w (e.g., $w_1, w_n$) based upon the biometric input $M_i$. The biometric data w may be input to the fuzzy vault transformation logic 330. A cryptographic key k may be randomly selected and component keys $k_i$ generated from the k via, e.g., Shamir Secret Sharing or another technique may be input to the encoder logic 320, which may output an encoded value $c_i$ that is a representation of the component key $k_i$. The encoded value $c_i$ may be input to the fuzzy commitment transformation logic 230, which may output helper data $h_i$. In an embodiment, $$h=(c)\text{XOR}(w), \text{e.g.,} h_i=(c_i)\text{XOR}(w_i) \text{ for } i=1, n.$$

Figure 3B:
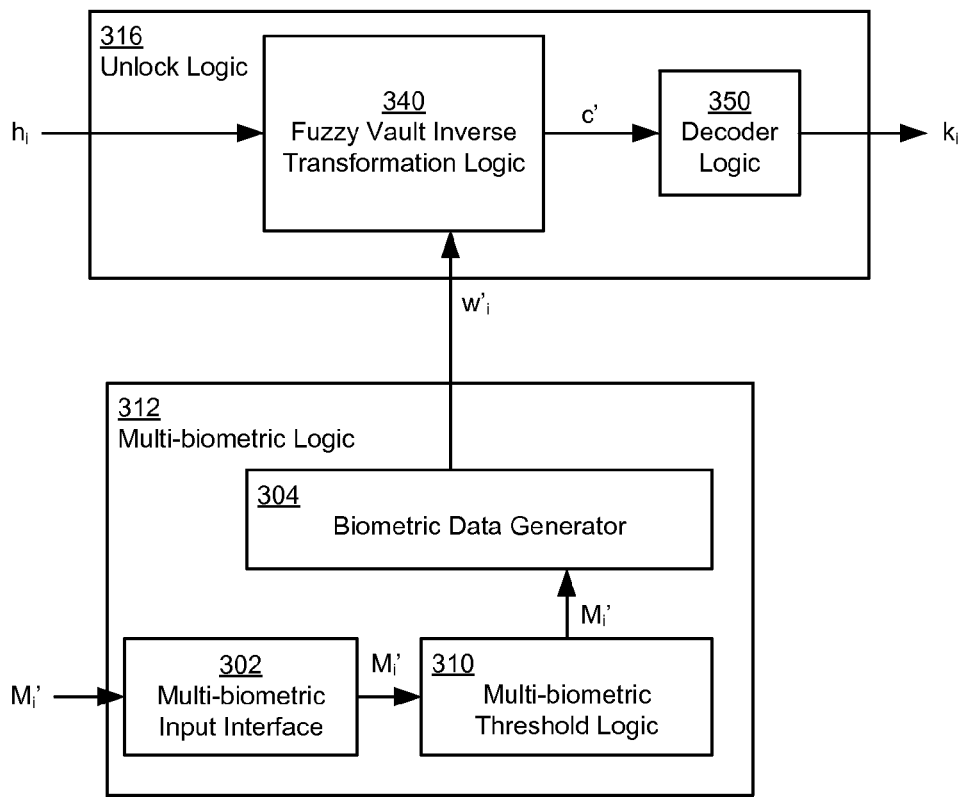
FIG. 3B is a block diagram of another apparatus to generate a key, according to an embodiment of the present invention.

Turning to FIG. 3B, a portion of a processor, such as the processor 100 of FIG. 1, is shown. In an unlock process, the helper data $h_i$ is inputted to fuzzy vault reverse transformation logic 340. Biometric input $M_i'$ (i=1 to n) may be received at the multi-biometric input interface 302 at a second time period and it may be determined by multi-biometric threshold logic 310 whether a threshold number t (where t≥2) of the received biometric input are valid. Provided the threshold t number of biometric input $M_i'$ are valid (e.g., close enough in value to M that there is deemed a match, the biometric data generator 312 may generate biometric data w' based on the biometric input $M_i'$. In some embodiments, t is less than n. The fuzzy commitment inverse transformation logic 340 may compute c'=(h) XOR (w')=(c) XOR (w XOR w'), which may be input to decoder 350 to produce the component keys $k_i$. The key k may be determined from $k_i$.

Figure 4A:
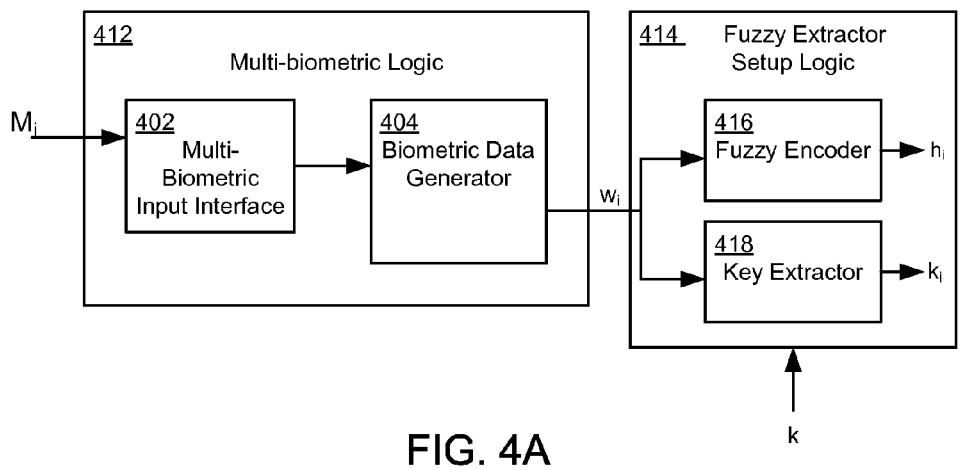
FIG. 4A is a block diagram of another apparatus to transform a key, according to an embodiment of the present invention.

FIGS. 4 A, B are block diagrams of apparatus to perform transformation and recovery of a key, according to another embodiment of the present invention. FIGS. 4A, B use fuzzy extractor methodology, which may be preferred when entropy associated with the biometric data is low.

Turning to FIG. 4A, shown is a block diagram of a portion of a processor, such as the processor 100 of FIG. 1. Biometric logic 412 includes multi-biometric input interface 402 and biometric data generator 404. The multi-biometric logic 412 may be coupled to fuzzy extractor setup logic 414, which includes a fuzzy encoder 416 and a key extractor 418.

In operation, the multi-biometric input interface 402 may receive biometric input $M_i$ and the biometric data generator 404 may generate n biometric data w $(=w_1, \ldots, w_n)$ based upon the biometric input $M_i$. The biometric data w may be input to the fuzzy extractor setup logic 414. The fuzzy encoder 416 may compute helper data h $(=h_1, \ldots, h_n)$ based on the biometric data w. The key extractor 418 may generate component keys $k_i$ from a key k (e.g., selected by a user) based on the biometric data w. In contrast to fuzzy commitment and fuzzy vault schemes, in embodiments that use the fuzzy extractor scheme, the component keys $k_i$ are not selected initially, but instead are determined from the biometric data w and the key k.

Figure 4B:
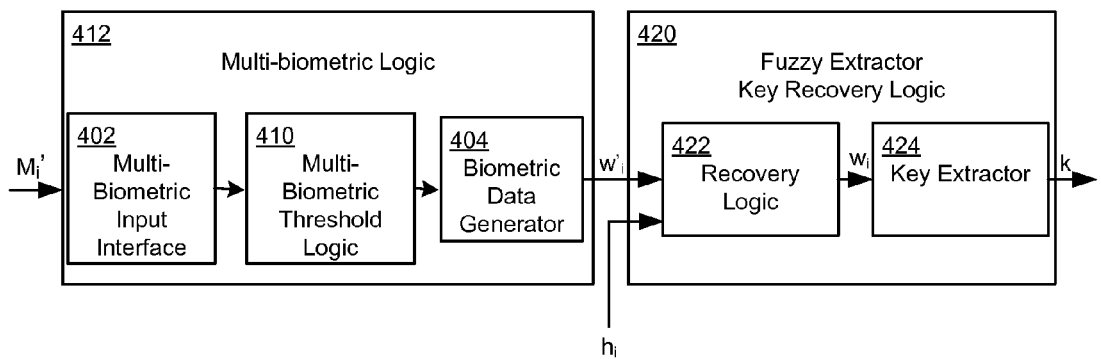
FIG. 4B is a block diagram of an apparatus to recover a key, according to an embodiment of the present invention.

Turning to FIG. 4B, in a key recovery process, n biometric input $M_i'$ may be received e.g., at a time period subsequent to the generation of the helper data h, by the multi-biometric input interface 402. Multi-biometric threshold logic 410 may determine whether a threshold t (where t≥2) number of the biometric input $M_i'$ are valid (e.g., correct). In an embodiment, t is less than n. Provided the threshold t number of $M_i'$ are valid, the biometric data generator 404 may generate biometric data w' $(=w_i, i=1, n)$ based on the measured biometric values.

The biometric data w' may be input to recovery logic 422 of fuzzy extraction key recovery logic 420, along with helper data $h_i$, to output the biometric data $w_i$ that was produced by the biometric data generator 404 during setup. The biometric data $w_i$ may be input to a key extractor 424 that may output the key k.

Figure 5:
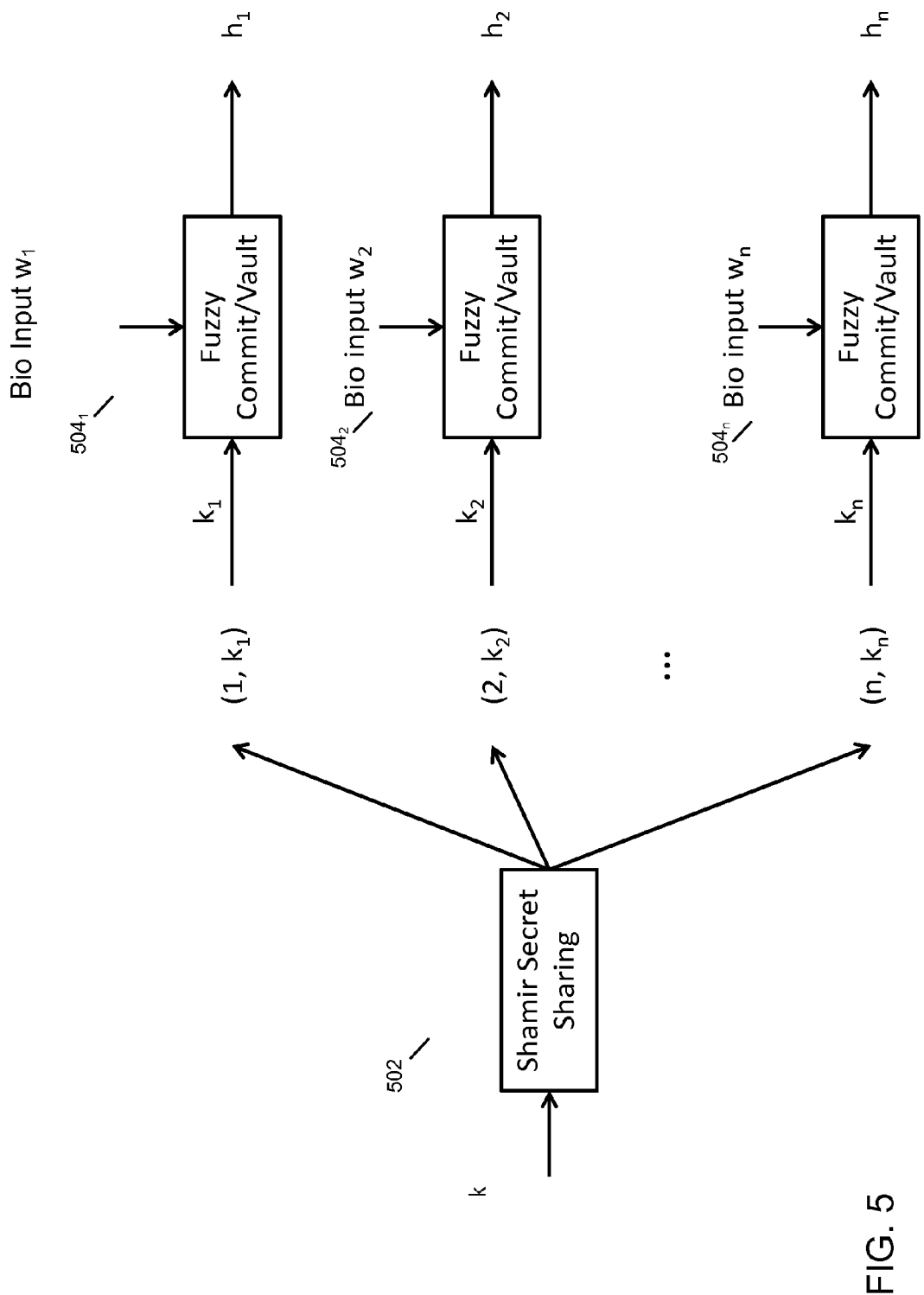
FIG. 5 is a block diagram that illustrates transformation of a cryptographic key k, according to an embodiment of the present invention.

FIG. 5 is a block diagram that illustrates transformation of a cryptographic key k through use of a fuzzy commitment scheme and/or a fuzzy vault scheme, according to an embodiment of the present invention. Shamir secret sharing logic 502 may be used to divide a selected key k into a plurality of component keys $k_i$. Blocks $504_1$-$504_n$ may be either fuzzy commitment logic or fuzzy vault logic that may be applied to a component key $k_i$ of the key k. A choice of whether to use fuzzy commitment logic or fuzzy vault logic may be dependent on a type of biometric measurement, e.g., fuzzy commitment logic for facial data, fuzzy vault logic for fingerprint data, etc.

In operation, a cryptographic key k may be input to the Shamir secret sharing logic 502, which may divide the key k into n component keys $k_i$, i=1 to n. A total of n distinct biometric data $w_i$ may be received from, e.g., a biometric data generator, each $w_i$ biometric data generated based on corresponding biometric input.

Each component key $k_i$ may be input to a respective fuzzy logic $504_i$. Also input to each fuzzy logic $504_i$ is respective biometric data $w_i$. For each biometric data $w_i$, a fuzzy logic scheme, selected based on the type of biometric data, may be applied.

Each fuzzy logic $504_i$ may process a respective component key $k_i$ with the respective $w_i$ to output respective helper data $h_i$. In an embodiment of the fuzzy logics 504 employed to produce the helper data $h_i$, at least one of the fuzzy logics, (e.g., $504_1$) differs from one or more of the other fuzzy logics $504_j$.

Figure 6:
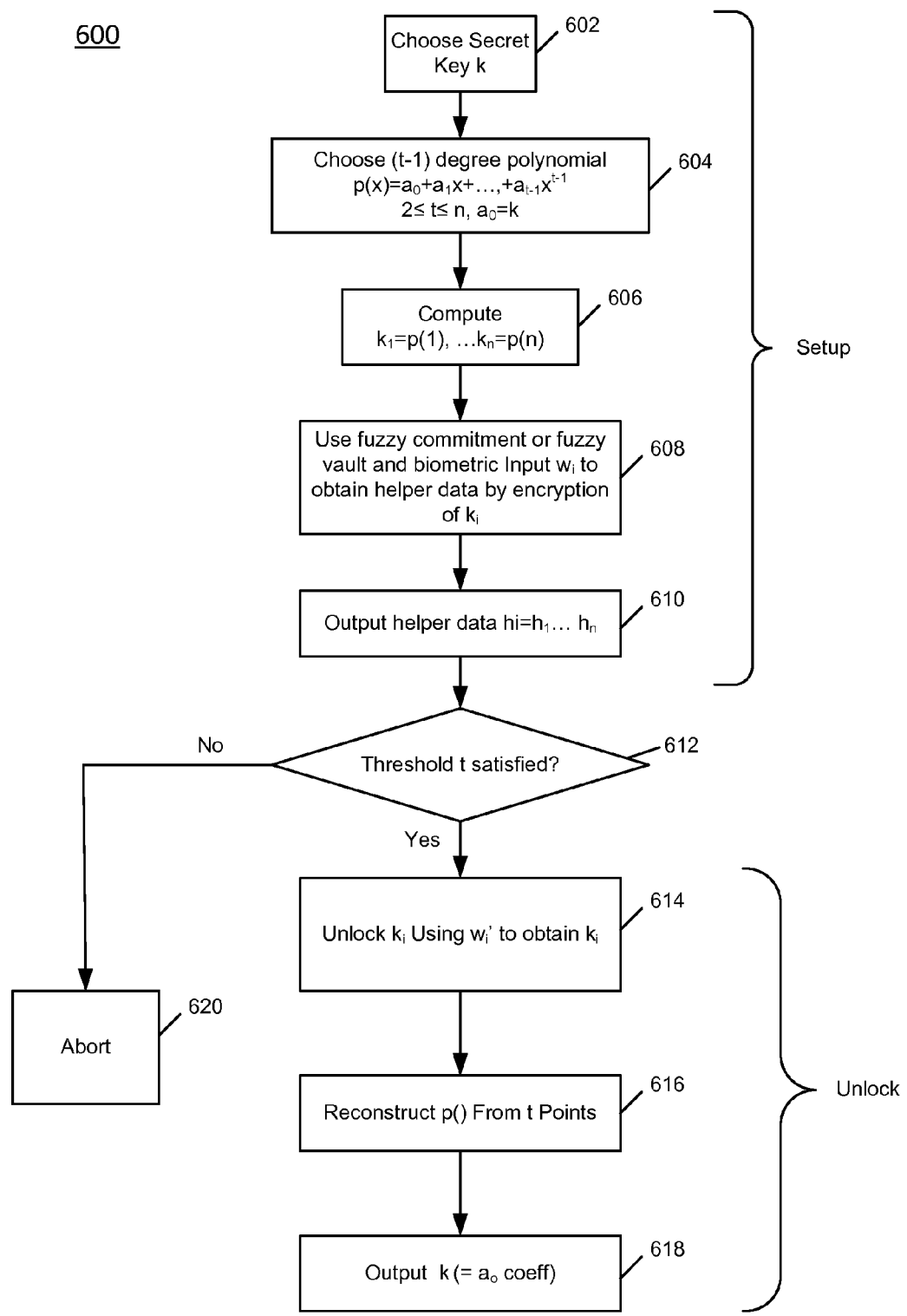
FIG. 6 is a flow diagram of a method to transform a secret key and to generate the secret key, according to an embodiment of the present invention.

Turning to FIG. 6, shown is a method 600 of transforming a secret key and generating (e.g., recovering) the secret key, according to an embodiment of the present invention.

In a setup portion 602-610 of the method 600, at block 602, a secret key k is chosen. For example, k may be chosen from, F, a finite field where k is an element of F, e.g., F is Galois field GF $(2^{128})$ for 128-bit keys.

Continuing to block 604, a (t−1) degree polynomial is chosen, where t is a threshold number of biometrics (out of n measured biometrics) to be satisfied, 2≤t≤n. The polynomial is $p(x)=a_0+a_1x+ \ldots +a_{t-1}x^{t-1}$, where $a_1, \ldots a_{t-1}$ are chosen randomly, and $a_0$ is assigned the value k.

Advancing to block 606, ki are computed. For example, $k_1=p(1), k_2=p(2), \ldots k_n=p(n)$. Note that $(1, k_1) (2, k_2), \ldots, (n, k_n)$ are points on the polynomial. Also note that any t out of n points can be used to reconstruct the polynomial p(x).

Proceeding to block 608, using either fuzzy commitment or fuzzy vault with biometric input $w_i$ (i=1, n), each $k_i$ can be encrypted (also "wrapped" herein) as helper data $h_i$. Characteristics of a biometric can influence whether to use fuzzy commitment or fuzzy vault. Continuing to block 610, helper data $h_i$ can be output, $(1, h_1), \ldots, (n, h_n)$.

In an unlock portion (e.g., blocks 612-618) of the method 600, at decision diamond 612 it is determined whether the threshold t number of measured biometric inputs $M_i'$ are valid. If the threshold t of biometric inputs is not met, advancing to block 620, unlock of the key k is aborted. If at least t measured biometrics are valid, moving to block 614, $k_i$ can be unlocked by inputting the corresponding biometric input $w_i'$ ($w_i'$ is based on the $M_i'$) and the helper data $h_i$ to the fuzzy commitment/fuzzy vault scheme. A total of t points $(1, k_1)$ to $(t, k_t)$ may be obtained. Moving to block 616, from these t points the polynomial p(x) may be reconstructed. Proceeding to block 618, the coefficient $a_0$ of p(x) may be output, which is equal to the key k.

Figure 7:
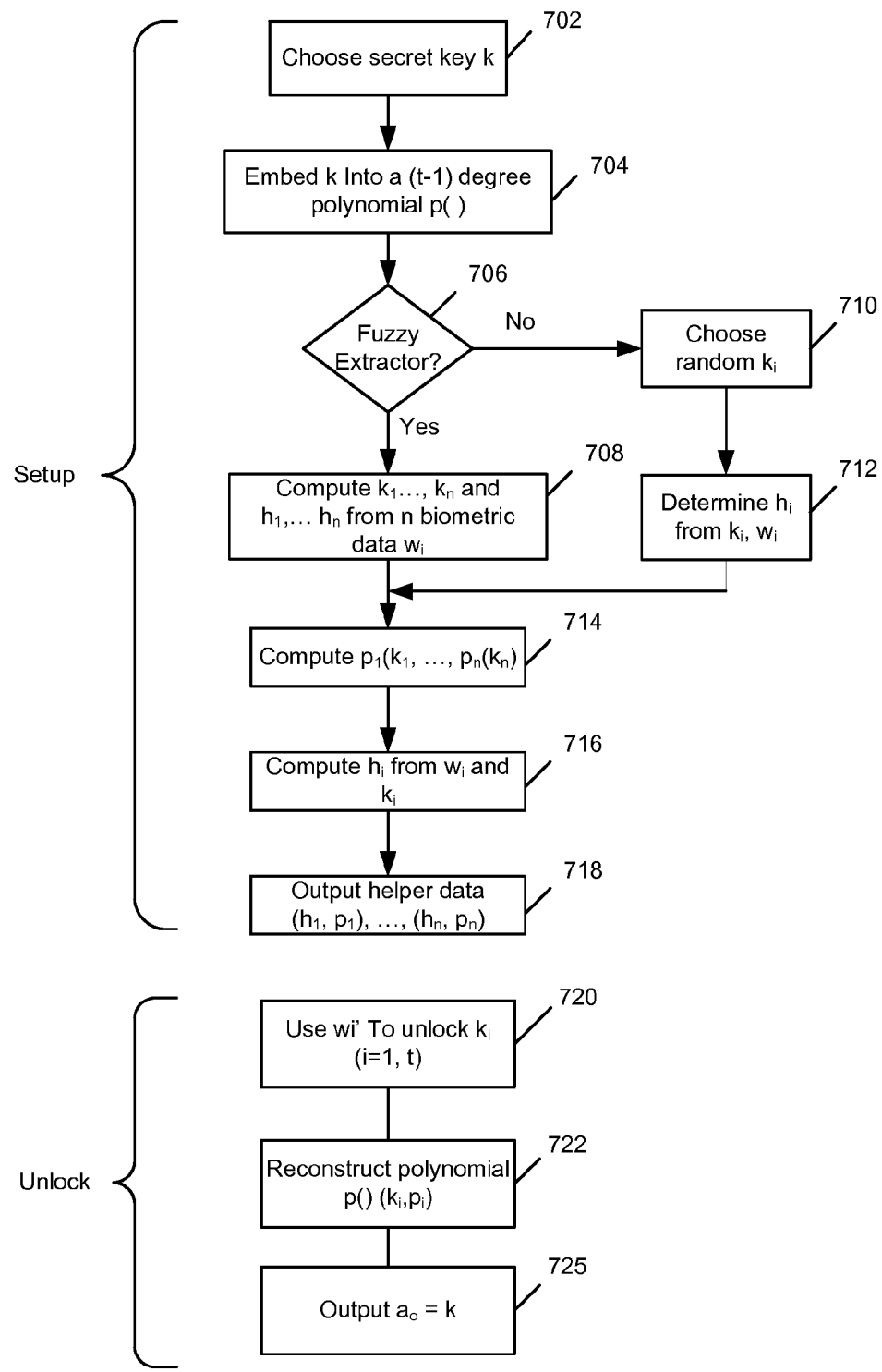
FIG. 7 is a flow diagram of a method to transform a secret key and to recover the secret key, according to an embodiment of the present invention.

Turning to FIG. 7, a flow diagram of a method is presented, according another embodiment of the present invention. The method presented in FIG. 7 may utilize any of fuzzy commitment, fuzzy vault, or fuzzy extractor schemes.

A setup process is depicted in blocks 702-716. The setup process is based on n biometric inputs $w_1, \ldots, w_n$ determined from biometric input $M_i$ received at a first time period.

At block 702 a random secret key k is selected. Continuing to block 704, k can be embedded into a polynomial of degree t−1, where t is a threshold number of valid biometric input needed in order to unlock the secret key k. The polynomial is $p(x)=a_0+a_1x+ \ldots +a_{t-1}x^{t-1}$, where $a_1, \ldots a_{t-1}$ are chosen randomly.

Advancing to decision diamond 706 the method branches to either block 710 (fuzzy commitment/fuzzy vault), or to block 708 (fuzzy extractor). For each $w_i$, if either fuzzy commitment or fuzzy vault schemes are most efficient, then $k_i$ are selected, e.g., by Shamir secret sharing or another technique. Moving to block 712, helper data $h_i$ may be determined using a fuzzy commitment setup process (e.g., FIG. 2A) or a fuzzy vault setup process (e.g., FIG. 3A).

If fuzzy extractor is selected, at block 708 each of the component keys $k_i$ and helper data $h_i$ may be extracted from $w_i$ using a fuzzy extractor scheme such as is illustrated in FIG. 4A.

Proceeding to block 714, a polynomial $p(k_i)$ is computed for each $k_i$, (i=1 to n). Moving to block 716, helper data is computed based on $w_i$ and $k_i$. Continuing to block 718, overall helper data $(h_i, p_i)$, i=1, n is output.

To unlock the key k (blocks 720-722), beginning at block 720 biometric data $w_i'$ based on biometric input $M_i'$ received at a second time period, may be used to determine each $k_i$, i=1 to t, via a corresponding unlock scheme, e.g., FIG. 2B, (fuzzy commitment), FIG. 3B (fuzzy vault), or FIG. 4B (fuzzy extractor). Advancing to block 722, the polynomial p(x) may be reconstructed from t points (e.g., t values of $k_i$). Moving to block 724, the coefficient $a_0$ may be extracted from the reconstructed polynomial, $a_0$=k and may be output.

Figure 8:
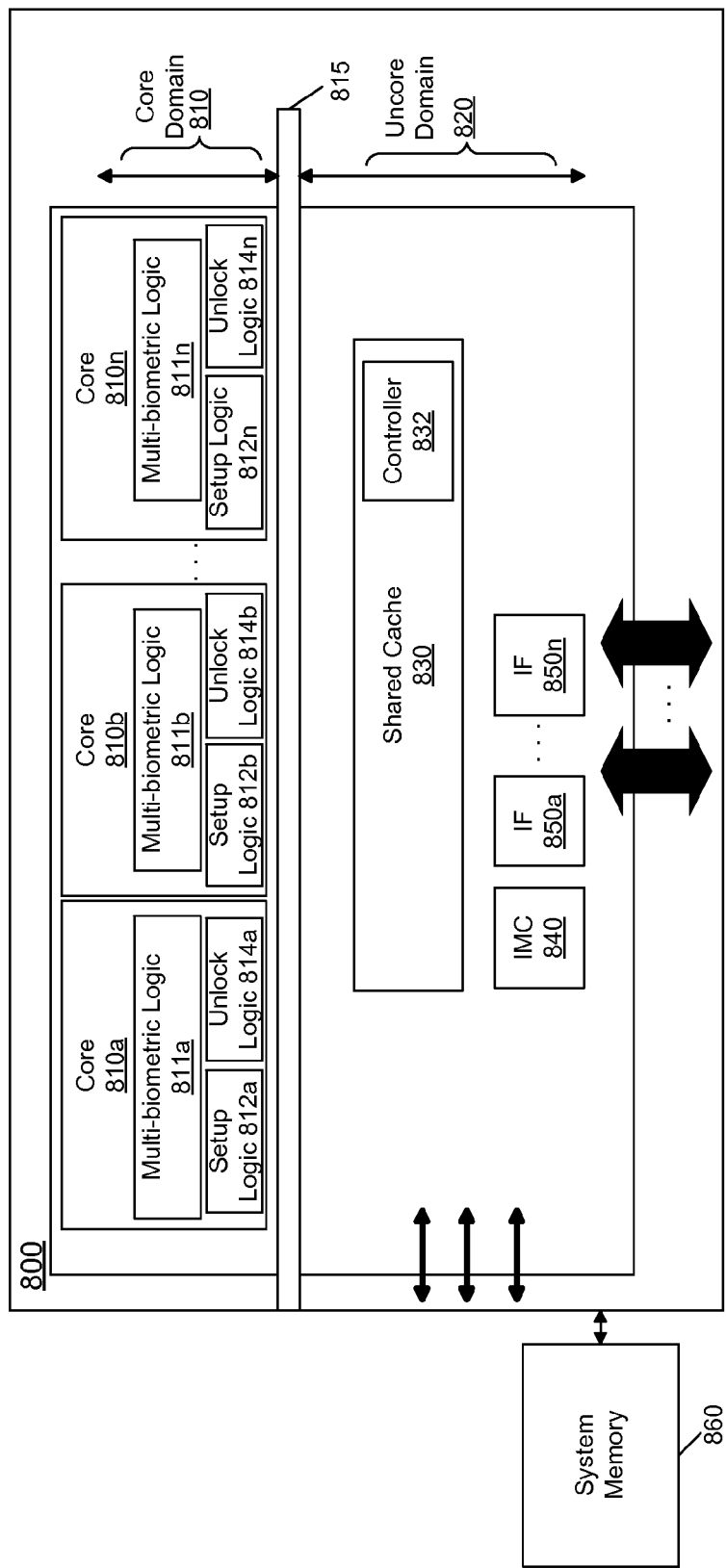
FIG. 8 is a block diagram of a processor in accordance with an embodiment of the present invention.

Referring now to FIG. 8, shown is a block diagram of a processor in accordance with an embodiment of the present invention. As shown in FIG. 8, processor 800 may be a multicore processor including a plurality of cores 810*a*-810*n* in a core domain 810. One or more of the cores may include multi-biometric logic 811 (e.g., 811*a*, 811*b*, ..., 811*n*), setup logic 812 (e.g., 812*a*, 812*b*, ..., 812*n*), and unlock logic 814 (e.g., 814*a*, 814*b*, ..., 814*n*), in accordance with embodiments of the present invention.

The cores 810*a*-810*n* may be coupled via an interconnect 815 to a system agent or uncore 820 that includes various components. As seen, the uncore 820 may include a shared cache 830 which may be a last level cache and includes a cache controller 832. In addition, the uncore may include an integrated memory controller 840 and various interfaces 850.

With further reference to FIG. 8, processor 800 may communicate with a system memory 860, e.g., via a memory bus. In addition, by interfaces 850, connection can be made to various off-chip components such as peripheral devices, mass storage and so forth. While shown with this particular implementation in the embodiment of FIG. 8, the scope of the present invention is not limited in this regard.

Figure 9:
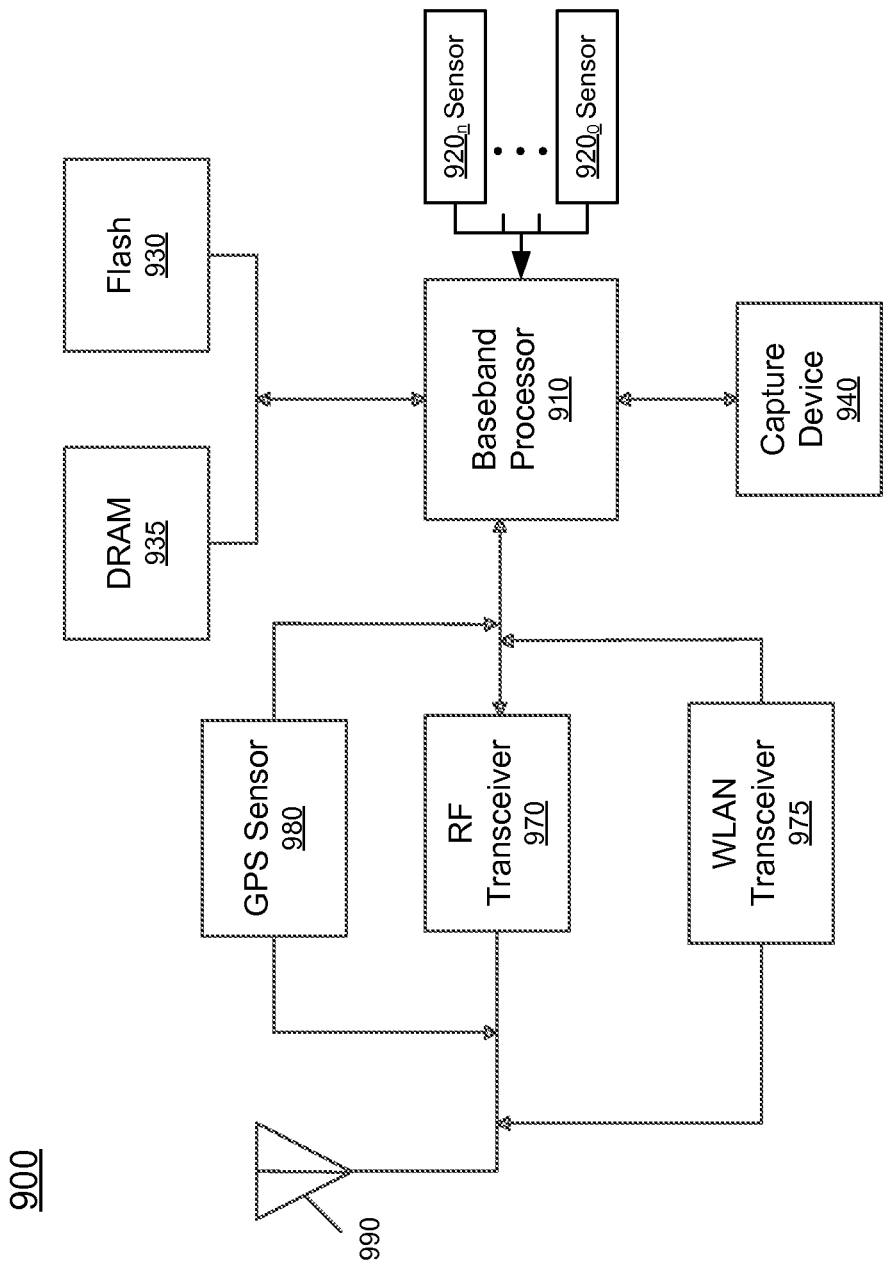
FIG. 9 is a block diagram of an example system with which embodiments of the present invention can be used.

Embodiments can be used in many different environments. Referring now to FIG. 9, shown is a block diagram of an example system 900 with which embodiments can be used. As seen, system 900 may be a smartphone or other wireless communicator. As shown in the block diagram of FIG. 9, system 900 may include a baseband processor 910, which can include multi-biometric logic to receive biometric input from, e.g., sensors 920$_0$-920$_n$, setup logic to transform a cryptographic key k to helper data h and to store the helper data h at a non-volatile memory outside of the baseband processor 910 such as flash memory 930, and unlock logic to recover (e.g., generate) the cryptographic key k from the stored helper data h, in accordance with embodiments of the present invention.

In general, the baseband processor 910 can perform various signal processing with regard to communications, as well as perform computing operations for the device. In addition, the baseband processor 910 may couple to a memory system including, in the embodiment of FIG. 9, a non-volatile memory (e.g., the flash memory 930) and a system memory, namely a dynamic random access memory (DRAM) 935. As further seen, baseband processor 910 can couple to a capture device 940 such as an image capture device that can record video and/or still images.

To enable communications to be transmitted and received, various circuitry may be coupled between baseband processor 910 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless signals, such as according to a Bluetooth™ standard or an IEEE 802.11 standard such as IEEE 802.11a/b/g/n can also be realized. Although shown at this high level in the embodiment of FIG. 9, understand the scope of the present invention is not limited in this regard.

Figure 10:
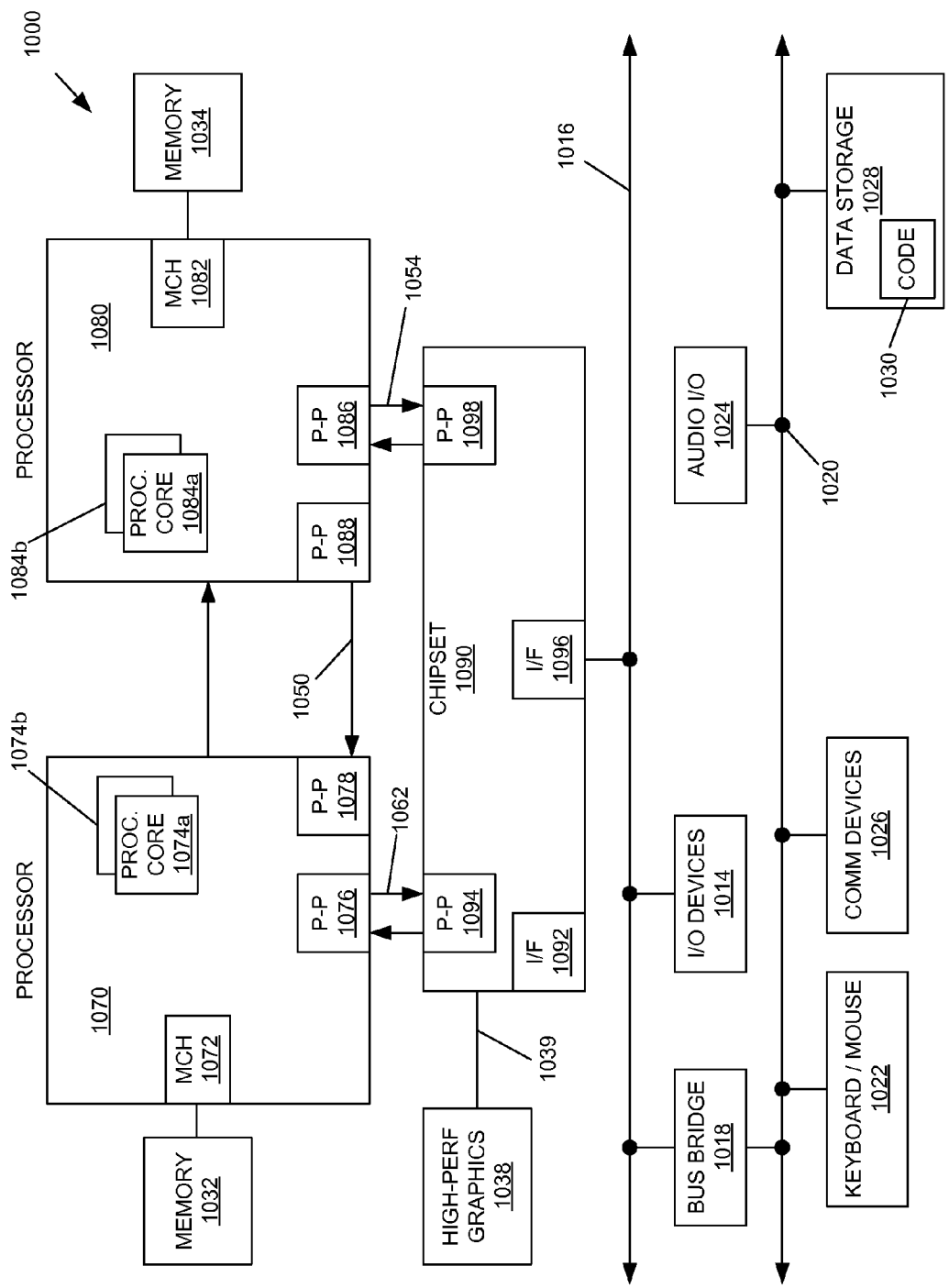
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074*a* and 1074*b* and processor cores 1084*a* and 1084*b*), although potentially many more cores may be present in the processors.

Still referring to FIG. 10, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of system memory (e.g., DRAM) locally attached to the respective processors. Each of the processors 1070 and 1080 may include multi-biometric fuzzy encoding/decoding logic, according to embodiments of the present invention.

First processor 1070 and second processor 1080 may be coupled to a chipset 1090 via P-P interconnects 1062 and 1054, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 10, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 1024 may be coupled to second bus 1020. Embodiments can be incorporated into other types of systems including mobile devices such as a smart cellular telephone, Ultrabook™, tablet computer, netbook, and so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

Example 1 is an apparatus that includes a processor, which includes a first core. The first core includes multi-biometric logic to output first biometric data $w_i$ (i=1 to n, n≥2), each $w_i$ determined based on a corresponding one of first biometric input $M_i$ received during a first time period The first core also includes setup logic to transform a cryptographic key k via a transformation that uses the first biometric data $w_i$. Transformation of the cryptographic key k results in output of helper data $h_i$ (i=1 to n). The cryptographic key k may be transformed via a transformation that includes at least one of a fuzzy commitment transformation scheme, a fuzzy vault transformation scheme, and a fuzzy extractor transformation scheme.

Example 2 includes the subject matter of example 1. The multi-biometric logic is also to output second biometric data $w_i'$, each $w_i'$ determined based on a corresponding one of second biometric input $M_i'$ received during a second time period. The first core further includes unlock logic to recover the cryptographic key k responsive to t (t≥2) biometric conditions being satisfied during the second time period, each biometric condition corresponding to one of the biometric inputs $M_i'$. The cryptographic key k is recovered from the helper data $h_i$ (i=1 to n), and the second biometric data $w_i'$.

Example 3 includes the subject matter of example 1, and may optionally include the subject matter of example 2. In example 3, transformation of the cryptographic key k includes division of the cryptographic key k into a plurality of component keys $k_i$ (i=1 to n), assignment of each component key $k_i$ to a corresponding $w_i$, selection of a corresponding component transformation scheme for each $w_i$, and determination of the helper data $h_i$ for each $k_i$ using the corresponding biometric data $w_i$ and the corresponding component transformation scheme. In example 3, optionally, each corresponding component transformation scheme is one of a fuzzy commitment transformation scheme and a fuzzy vault transformation scheme. Optionally, at least one selected component transformation scheme differs from at least one other selected component transformation scheme.

Example 4 includes the subject matter of example 1. The apparatus is to further perform a determination of a plurality of component keys $k_i$ (i=1 to n) via a fuzzy extractor transformation scheme, and each of the component keys $k_i$ is to be determined from the cryptographic key k based on corresponding biometric data $w_i$. The apparatus is further to perform a determination of the helper data $h_i$ (i=1 to n) via the fuzzy extractor transformation scheme. Each of the $h_i$ is to be determined based on corresponding biometric data $w_i$.

Example 5 includes the subject matter of examples 1 and 2, and optionally includes the subject matter of example 3 or example 4. In example 5, the number t of conditions to be satisfied is less than the number n of biometric measurements $w_i'$.

Example 6 is a method that includes transforming, by a processor, a cryptographic key k into helper data $h_i$ (i=1, n) including determining each $h_i$ from the cryptographic key k using corresponding biometric data $w_i$ and a corresponding component transformation scheme. Each $w_i$ is based upon corresponding distinct biometric input $M_i$ (i=1, n) received during a first time period. The method also includes storing the helper data $h_i$ in a non-volatile memory.

Example 7 includes the subject matter of example 6. Optionally, at least one of the component transformation schemes is a fuzzy commitment transformation scheme. Optionally, at least one of the component transformation schemes is a fuzzy vault transformation scheme.

Example 8 includes the various features of example 6. Determining each $h_i$ from the cryptographic key k further includes determining each of a plurality of component keys $k_i$ (i=1 to n) based on the biometric data $w_i$ via a fuzzy extractor transformation scheme, and determining the helper data $h_i$ based on the biometric data $w_i$ and the component key $k_i$ via the fuzzy extractor transformation scheme.

Example 9 includes the subject matter of example 6 and optionally includes the subject matter of example 7. Transforming includes dividing the cryptographic key into n component keys $k_i$, assigning corresponding biometric data $w_i$ to each of the component keys $k_i$, selecting, for each $w_i$, the corresponding component transformation scheme, and performing a transformation on each of the component keys $k_i$ using the corresponding biometric data $w_i$ via the corresponding component transformation to produce the corresponding helper data $h_i$.

Example 10 includes the subject matter of example 6 and either example 8 or examples 7 and 9. Example 10 further includes recovering the cryptographic key by receiving n biometric inputs $M_i'$ during a second time period subsequent to the first time period, determining that a threshold of at least t of the n biometric inputs $M_i'$ received at the second time are valid, where t is at least two, and where each of the biometric inputs $M_i'$ corresponds to one of the helper data $h_i$, determining biometric data $w_i'$ (i=1, t), wherein each $w_i'$ is determined from a valid biometric input $M_i'$ corresponds to one of the helper data $h_i$, determining t component keys $k_i$ (i=1 to t) by performing a respective inverse transformation on the corresponding helper data $h_i$ and the corresponding biometric data $w_i'$ (i=1, t), where each inverse transformation corresponds to the component transformation scheme used to determine the corresponding helper data $h_i$, and determining the cryptographic key k from the component keys $k_i$ (i=1 to t). Optionally, the threshold number t of biometric inputs $M_i'$ to be valid is less than the total number n of biometric inputs $M_i'$ received.

Example 11 is at least one computer-readable storage medium having instructions stored thereon for causing a system to perform the method of any one of examples 6-10.

Example 12 is an apparatus to perform the method of any one of examples 6-10.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a processor including a first core, the first core comprising:
        multi-biometric logic to output first biometric data $w_i$ (i=1 to n, n≥2), each $w_i$ determined based on a corresponding one of first biometric input $M_i$ (i=1 to n, n ≥2) received during a first time period; and
        setup logic to, in a first mode, transform a cryptographic key k including divide the cryptographic key k into a plurality of component keys $k_i$ (i =1 to n) and transform each component key $k_i$ via a corresponding transformation scheme that uses a corresponding one of the first biometric data $w_i$, wherein transformation of the cryptographic key k results in output of a transformed cryptographic key k' that includes helper data $h_i$ (i=1 to n), wherein the multi-biometric logic is further to output second biometric data $w_i'$ (i=1 to n), each $w_i'$ determined based on a corresponding one of second biometric input $M_i'$ received during a second time period, and wherein the first core further comprises unlock logic to recover the cryptographic key k responsive to a threshold number t (t ≥2) biometric conditions being satisfied during the second time period, each biometric condition corresponding to one of the biometric inputs $M_i'$, and wherein the cryptographic key k is to be recovered from the threshold number t of the helper data $h_i$ and the threshold number t of the second biometric data $w_i'$.

2. The apparatus of claim 1, wherein each corresponding transformation scheme includes one of a fuzzy commitment transformation scheme and a fuzzy vault transformation scheme.

3. The apparatus of claim 1, wherein transformation of the cryptographic key k includes:
    assignment of each component key $k_i$ to a corresponding $w_i$;
    selection of the corresponding transformation for each $w_i$; and
    determination of the helper data $h_i$ for each $k_i$ using the corresponding biometric data $w_i$ and the corresponding component transformation scheme.

4. The apparatus of claim 3, wherein at least one selected component transformation scheme differs from at least one other selected component transformation scheme.

5. The apparatus of claim 1, wherein the setup logic in a second mode is to:
    determine the cryptographic key k and the component keys $k_i$ (i=1 to n) via a fuzzy extractor transformation scheme based on the biometric data $w_i$; and
    determine the helper data $h_i$ (i=1 to n) via the fuzzy extractor transformation scheme.

6. The apparatus of claim 1, wherein t is less than n.

7. A method comprising:
    in a first mode:
        dividing, by a processor, a cryptographic key k into a plurality of component keys $k_i$ (i=1 to n);
        transforming, by the processor, at least one component key $k_i$ into a transformed component key that includes corresponding helper data $h_i$ using corresponding biometric data $w_i$ and a corresponding component transformation scheme, each $w_i$ based upon corresponding distinct biometric input $M_i$ received during a first time period;
        storing, each transformed component key including the corresponding helper data $h_i$ in a non-volatile memory;
        receiving n biometric inputs $M_i'$ during a second time period subsequent to the first time period;
        determining that at least a threshold number t of the n biometric inputs $M_i'$ received during the second time period are valid, wherein t is at least two, wherein each of the biometric inputs $M_i'$ corresponds to one of the helper data $h_i$;
        responsive to an indication that at least t of the n biometric inputs $M_i'$ are valid, determining biometric data $w_i'$ (i=1, t), wherein each $w_i'$ is determined from the corresponding valid biometric input $M_i'$ and each $w_i'$ corresponds to one of the helper data $h_i$; and
        performing a respective inverse transformation on the corresponding helper data $h_i$ and the corresponding biometric data $w_i'$ (i=1, t) wherein each inverse transformation corresponds to the selected component transformation scheme used to determine the corresponding helper data $h_i$.

8. The method of claim 7, wherein transforming comprises:
    assigning corresponding biometric data $w_i$ to each of the at least one component key $k_i$;
    selecting, for each of the at least one component $k_i$, the corresponding component transformation scheme; and
    performing a respective transformation on each of the at least one component key $k_i$ using the corresponding assigned biometric data $w_i$ via the corresponding selected component transformation scheme to produce the corresponding helper data $h_i$.

9. The method of claim 7, wherein at least one of the corresponding component transformation schemes includes a fuzzy commitment transformation scheme or a fuzzy vault transformation scheme.

10. The method of claim 7, further comprising:
in a second mode:
determining the cryptographic key k and the component keys $k_i$ (i=1 to n) based on the biometric data $w_i$ via a fuzzy extractor transformation scheme; and
determining, for each of the plurality of component keys $k_i$, the helper data $h_i$ based on the biometric data $w_i$ via the fuzzy extractor transformation scheme.

11. At least one computer-readable non-transitory storage medium having instructions stored thereon for causing a system to:
transform a cryptographic key k to a transformation that comprises helper data $h_i$ (i =1 to n, n >2) by utilizing n first biometric data $w_i$ (i=1 to n), each $w_i$ associated with a corresponding biometric input $M_i$ to be received by the system at a first time period;
responsive to satisfaction of a threshold number t of biometric conditions, wherein 2 ≤t<n, recover the cryptographic key k from the helper data $h_i$ (i =1 to t) using t second biometric data $w_i'$ (i =1 to t), each $w_i'$ determined based on a corresponding second biometric input $M_i'$ to be received at a second time period subsequent to the first time period;
determine that at least t of the second biometric inputs $M_i'$ are valid;
determine second biometric data $w_i'$ (i=1, t) based on corresponding $M_i'$;
perform an inverse transformation on each of t pairs, each pair comprising $h_i$ and a corresponding $w_i'$; and
determine the cryptographic key k based on the inverse transformation of the t pairs.

12. The at least one computer-readable non-transitory storage medium of claim 11, wherein the instructions to transform the cryptographic key k include instructions to divide the cryptographic key k into a plurality of component keys $k_i$ and transform each component key $k_i$ via a corresponding component transformation scheme that uses the corresponding first biometric data $w_i$.

13. The at least one computer-readable non-transitory storage medium of claim 12, wherein the corresponding component transformation scheme to transform at least one of the component keys $k_i$ is one of a fuzzy commitment transformation scheme and a fuzzy vault transformation scheme.

14. The at least one computer-readable non-transitory storage medium of claim 12, wherein transformation of each component key $k_i$ uses a corresponding component transformation scheme, wherein at least one of the component transformation schemes used in the transformation differs from another of the component transformation schemes.

15. The at least one computer-readable non-transitory storage medium of claim 11, further comprising instructions to:
determine the cryptographic key k and each of a plurality of component keys $k_i$ (i=1 to n) based on the biometric data $w_i$ via a fuzzy extractor scheme;
determine the helper data $h_i$ based on the biometric data $w_i$ via the fuzzy extractor scheme;
select a (t−1) degree polynomial p, 2≤t≤n;
compute $p_i(k_i)$ (i =1 to n); and
output the transformation that includes overall helper data $(h_i, p_i)$ (i =1 to n).

16. The at least one computer-readable non-transitory storage medium of claim 12, further including instructions to:
determine whether at least the threshold number t of second biometric inputs $M_i'$ (i=1, t) are valid and if so:
for each valid $M_i'$, determine second biometric data $w_i'$ (i=1, t) based on the corresponding $M_i'$ (i=1, t);
perform an inverse transformation on each of t pairs, each pair comprising $h_i$ and a corresponding $w_i'$, to generate recovered component keys $k_i$ (i =1 to t); and
determine the cryptographic key k based on the recovered component keys $k_i$ (i =1 to t).

* * * * *